(12) United States Patent
Glad et al.

(10) Patent No.: US 11,899,887 B1
(45) Date of Patent: Feb. 13, 2024

(54) SUCTION OPENING IN A CAPACITANCE MODULE

(71) Applicant: Cirque Corporation, Sandy, UT (US)

(72) Inventors: Paul Glad, Sandy, UT (US); Douglas Steck, Riverton, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 17/888,709

(22) Filed: Aug. 16, 2022

(51) Int. Cl.
G06F 3/033 (2013.01)
G06F 3/044 (2006.01)
B32B 7/12 (2006.01)
B32B 37/12 (2006.01)
B32B 37/10 (2006.01)
B32B 3/26 (2006.01)
G06F 3/0354 (2013.01)

(52) U.S. Cl.
CPC .............. G06F 3/044 (2013.01); B32B 3/266 (2013.01); B32B 7/12 (2013.01); B32B 37/1018 (2013.01); B32B 37/1284 (2013.01); B32B 2457/208 (2013.01); G06F 3/03547 (2013.01)

(58) Field of Classification Search
CPC ..... G06F 3/044; G06F 3/03547; B32B 3/266; B32B 7/12; B32B 37/1018; B32B 37/1284; B32B 2457/208
USPC .................................. 345/156, 173, 157, 174
See application file for complete search history.

(56) References Cited

U.S. PATENT DOCUMENTS

| | | | |
|---|---|---|---|
| 5,869,790 A * | 2/1999 | Shigetaka | H05K 3/361 345/173 |
| 6,284,568 B1 * | 9/2001 | Yamamoto | H01L 21/4853 257/E21.508 |
| 7,710,405 B2 | 5/2010 | Keski-jaskari | |
| 10,061,146 B2 | 8/2018 | Kida | |
| 11,099,702 B2 | 8/2021 | Hagihara | |
| 2008/0267666 A1 * | 10/2008 | Shirokoshi | G03G 21/1647 399/222 |
| 2009/0204004 A1 * | 8/2009 | Adachi | A61B 8/12 600/459 |
| 2011/0130063 A1 * | 6/2011 | Matsubayashi | D01D 5/0985 425/72.2 |
| 2011/0211323 A1 * | 9/2011 | Unriin | H01L 25/0657 361/783 |
| 2014/0001579 A1 * | 1/2014 | Liu | B81C 1/00182 438/53 |
| 2015/0186903 A1 * | 7/2015 | Takahashi | G01S 17/89 356/5.1 |
| 2015/0193716 A1 * | 7/2015 | Tanigawa | G06Q 10/06393 705/7.39 |
| 2019/0235660 A1 * | 8/2019 | Kim | G06F 3/0414 |
| 2019/0236660 A1 * | 8/2019 | Polizzotto | G06F 16/248 |
| 2022/0382508 A1 * | 12/2022 | Viscusi | H03K 17/962 |

* cited by examiner

Primary Examiner — Thuy N Pardo

(57) ABSTRACT

An apparatus may include a stack of layers, the stack including a sensor layer containing a set of electrodes and a suction opening defined through the sensor layer, and a capacitance reference surface adjacent to the sensor layer.

20 Claims, 15 Drawing Sheets

SUCTION OPENING IN A CAPACITANCE MODULE

FIELD OF THE DISCLOSURE

This disclosure relates generally to systems and methods for capacitance modules. In particular, this disclosure relates to systems and methods for the manufacture of capacitance modules and adhering capacitive sensors to capacitance reference surfaces.

BACKGROUND

A touchpad, found in devices such as a laptop, smart phones, and kiosks, is often made of an overlay and a capacitance sensor located underneath the overlay. A user interacts with the touchpad by touching the overlay, and the capacitance sensor underneath the overlay senses the touch input and interprets the input so that the user may interact with the laptop or other device. Some overlays are made of a flexible material, such as plastic. The responsiveness of a touchpad is based in part, on how uniformly the overlay and capacitance sensor are joined together. Air pockets between the overlay and capacitance sensor may cause a touchpad to be less responsive and consistent. Many methods of manufacturing exist to create a tight and uniform seal between a capacitance sensor and overlay.

An example of a touch pad construction is disclosed in U.S. Pat. No. 7,710,405 issued to Turo Keski-jaskari. This reference describes a capacitive keypad and/or touchpad construction that includes a flexible or rigid printed circuit board and a non-conductive keypad/touchpad top surface layer. A semi-conductive adhesive layer in between said flexible or rigid printed circuit board and said non-conductive keypad/touchpad top surface layer serves both to connect the top surface layer to the printed circuit board and to act as capacitive sensing layer.

Another example of a touch pad construction is disclosed in U.S. Pat. No. 10,061,146 issued to Shinobu Kida, et al. This reference describes a front panel, a touchpad, and a display cell are adhered and fixed, and these and a back light are held by a bracket to construct a display body unit. When the display body unit is mounted on a support, the front panel is fixed to the support with an adhesive layer therebetween. In this state, each of mounting portions has position adjustability in the vertical direction (Z direction). In the state having position adjustability, the mounting portion is fixed to the support by a fixing mechanism.

Another example of a touch pad construction is disclosed in U.S. Pat. No. 11,099,702 issued to Hideyuki Hagihara, et al. This reference describes a touchscreen includes a first substrate, a second substrate, an adhesive, a first wiring layer, a second wiring layer, a through hole, and an electrically conductive adhesive. The first substrate includes a first transparent conductive film formed at a surface of the first substrate. The second substrate includes a second transparent conductive film formed at a surface of the second substrate. The adhesive adheres the first and second substrates to each other. The first wiring layer is formed on the surface of the first substrate. The second wiring layer is formed on the surface of the second substrate. The through hole pierces through the second substrate. The electrically conductive adhesive is provided in the through hole, and connects the first wiring layer and the second wiring layer. Each of these references are herein incorporated by reference for all that they disclose.

SUMMARY

In one embodiment, an apparatus may include a substrate containing a set of capacitance-sensing electrodes and a suction opening defined through the substrate; air and/or adhesive may be suctioned through the suction opening during vacuum adhesion between the substrate and another surface.

The position of the suction opening may be based, in part, on the position of the capacitance-sensing electrodes on the substrate.

A suction opening may be defined in each corner of the substrate.

Rows of suction openings may be defined in the substrate.

The substrate may be adhered to a rigid overlay, such as glass, by the vacuum adhesion process.

The adhesive may have a thickness between five and one hundred microns.

In another embodiment, an apparatus may include a stack of layers, the stack including a sensor layer containing a set of electrodes and a suction opening defined through the sensor layer, and a capacitance reference surface adjacent to the sensor layer.

The capacitance reference surface may be a touchpad overlay.

The apparatus may be a part of a keyboard housing.

The capacitance reference surface may be made of a rigid material, such as glass.

The suction opening may be defined through a shield layer in the stack of layers.

The suction opening may be defined through a component layer in the stack of layers.

The suction opening may be defined through every layer in the stack of layers.

Multiple suction openings may be defined through the sensor layer.

Multiple suction openings may be defined in rows on the sensor layer.

One suction opening may be defined in each corner of the sensor layer.

Adhesive may be suctioned through the suction opening during a vacuum adhesion process between the stack of layers and the capacitance reference surface.

The location of the suction opening may be based, in part, on the position of the electrodes on the sensor layer.

In another embodiment, a method for adhering a capacitive sensor to a capacitance reference surface may include: defining at least one suction opening in the capacitive sensor; applying an adhesive to one side of either the capacitive sensor or the capacitance reference surface, such that the adhesive is disposed between the capacitive sensor and the capacitance reference surface; and joining the capacitive sensor and capacitance reference surface by applying a force to the capacitive sensor and the capacitance reference surface in a vacuum chamber, where air and adhesive are suctioned through the at least one suction opening in the capacitive sensor, and the suctioning of air and adhesive through the at least one suction opening may reduce the amount of air bubbles between the capacitive sensor and the capacitance reference surface.

The position of the at least one suction opening defined in the capacitive sensor may be based, in part, on the location of electrodes in the capacitive sensor.

Figure 1:
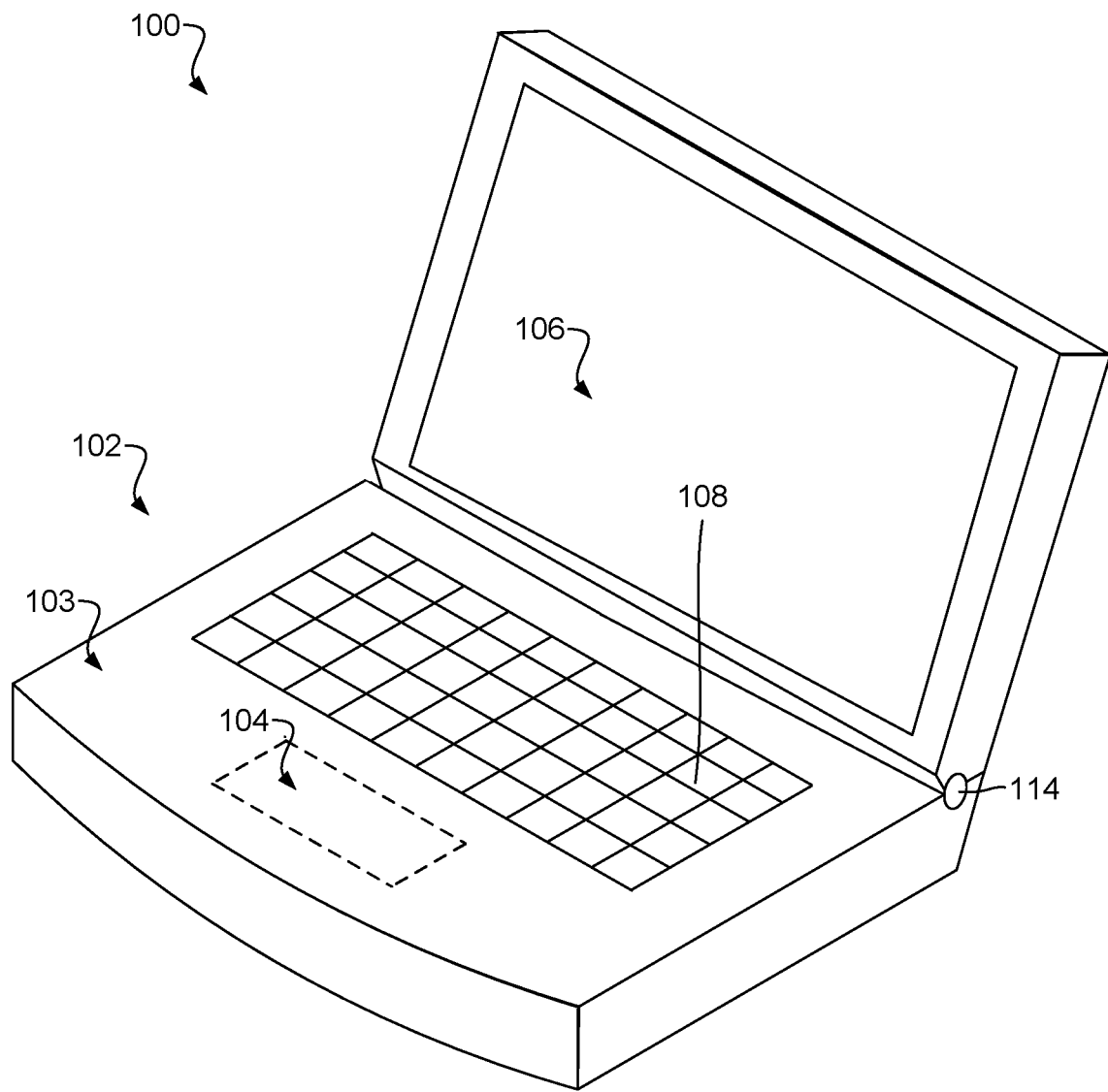
FIG. 1 depicts an example of an electronic device in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the terms "node" and "anti-node" may generally refer to parts of a mutual capacitance sensor. A node may be understood as the portion of a mutual capacitance sensor where two electrodes overlap. Such locations of a mutual capacitance sensor may be especially sensitive to capacitance changes. An anti-node may be a vacant portion of a mutual capacitance sensor where there are no electrodes, overlapping or otherwise.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
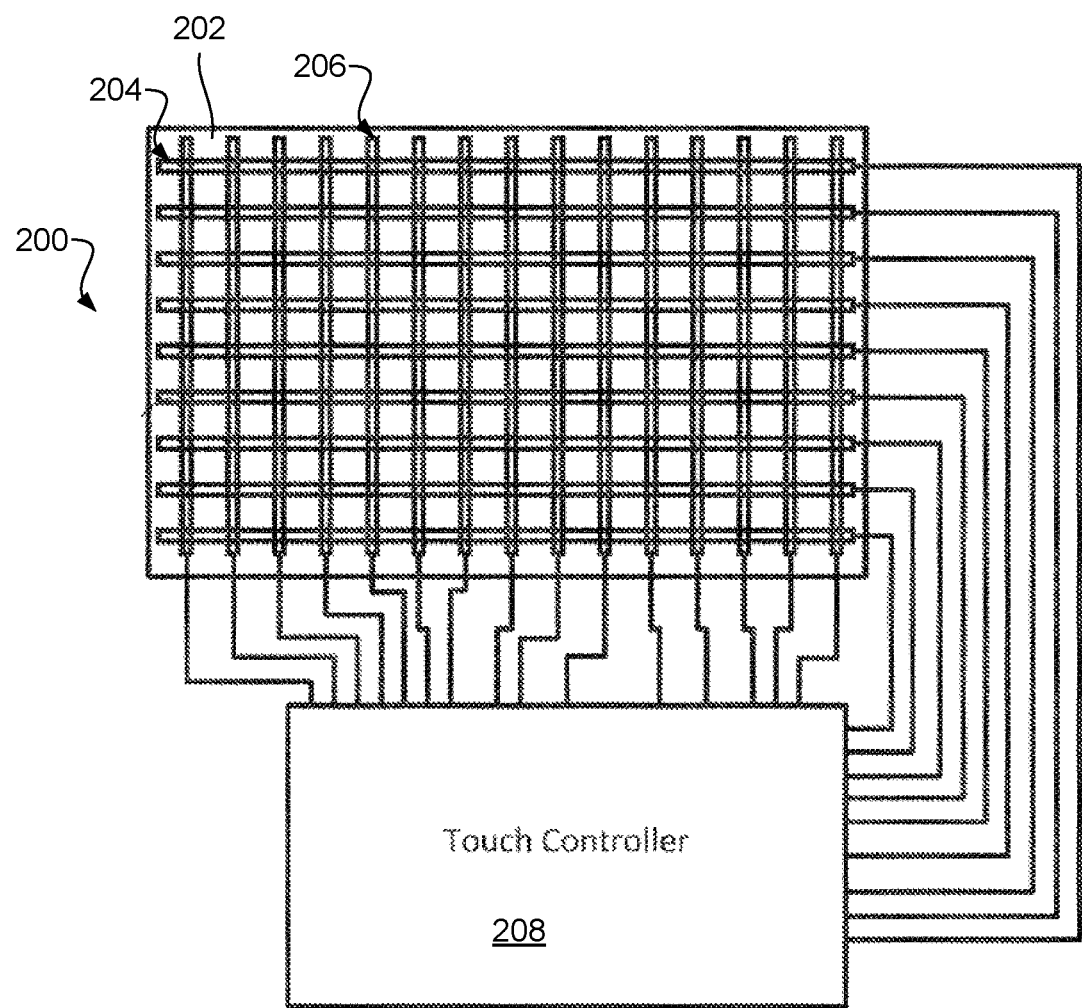
FIG. 2 depicts an example of a substrate with a first set of electrodes and a second set of electrodes in accordance with the present disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
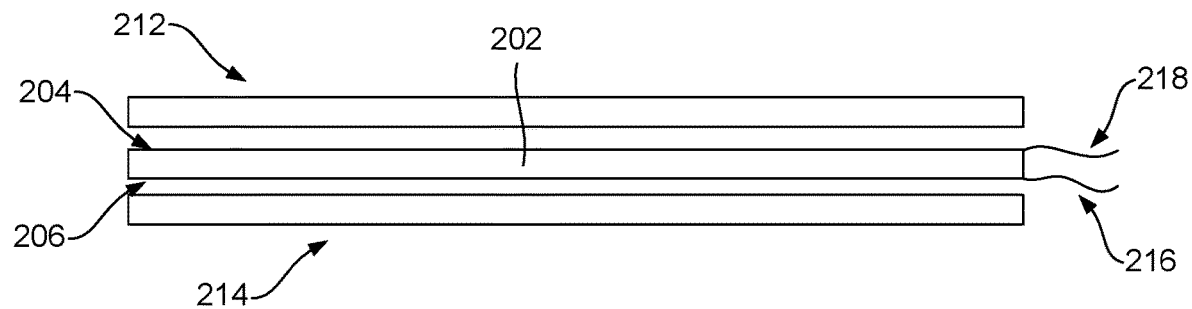
FIG. 3 depicts an example of a touch pad in accordance with the present disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
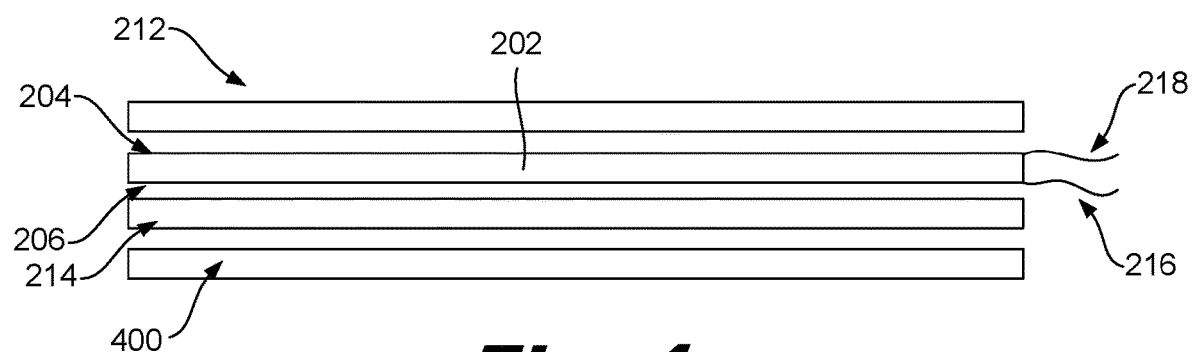
FIG. 4 depicts an example of a touch screen in accordance with the present disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5A:
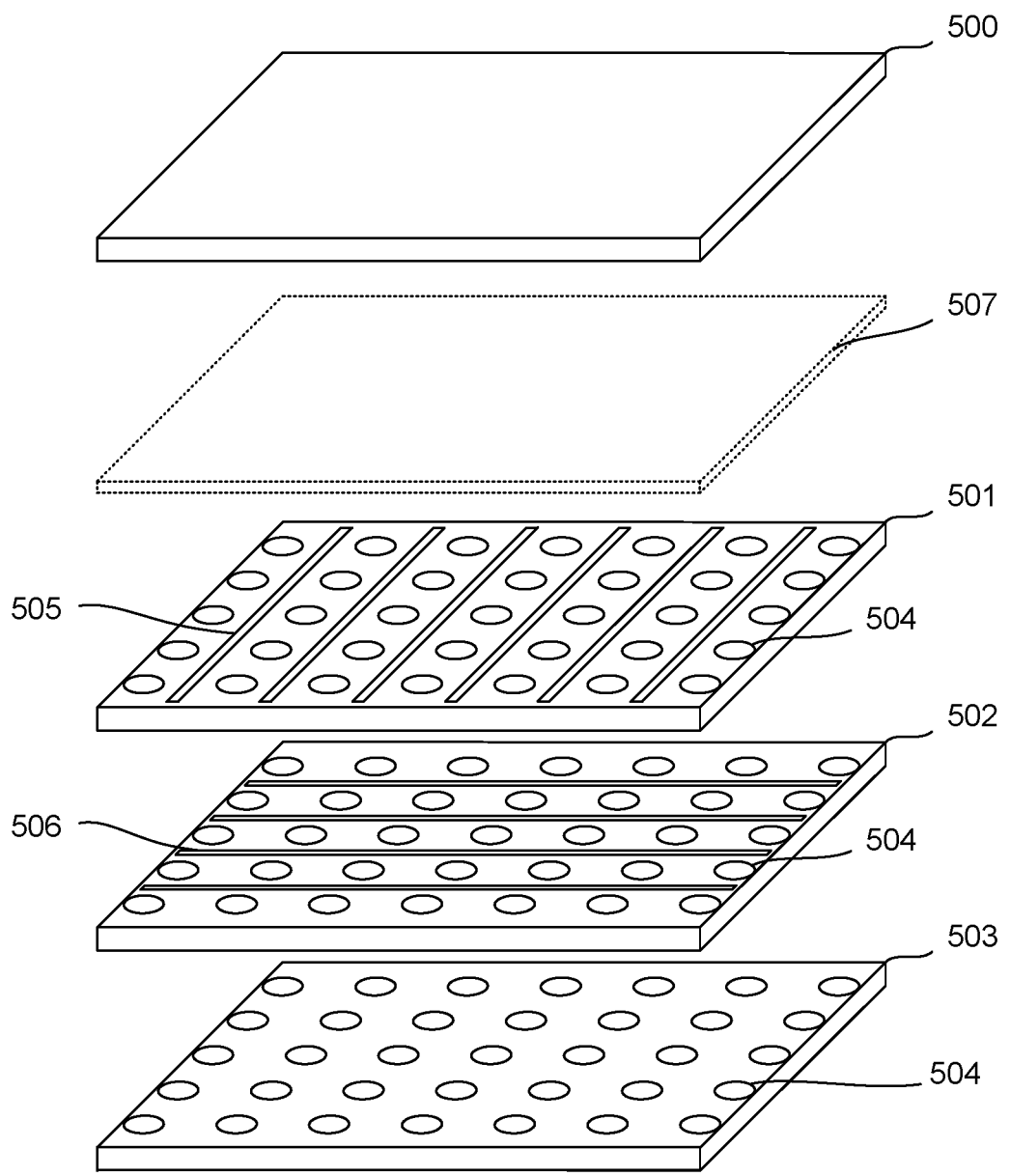
FIG. 5a depicts an exploded view of a stack of layers in accordance with the present disclosure.

FIG. 5a depicts a stack of layers in accordance with the disclosure. The stack, shown with an exploded view, includes four layers: a capacitance reference surface 500, a first electrode layer 501, a second electrode layer 502, and a shield layer 503. For illustrative purposes, an adhesive 507 is represented by a dashed box. The adhesive 507 is located between the capacitance reference surface 500 and the first electrode layer 501. Altogether, the stack of layers forms a capacitance module.

While the stack of layers in this example identifies four layers, in other examples, a stack may include a different number of layers. For example, a stack may include two layers, three layers, five layers, a different number of layers, or combinations thereof.

The capacitance reference surface 500 may be made out of a rigid material, such as glass. The shear modulus of the rigid material may be 26.2 GPa. In other examples, the shear modulus of the rigid material may have a different value. For example, the shear modulus of a rigid material may have a value within the range of 6 to 35 GPa.

The first electrode layer 501 and second electrode layer 502 may form a mutual capacitance sensor. In this example, the first electrode layer 501 contains a first set 505 of electrodes, and the second electrode layer 502 contains a second set 506 of electrodes. Electrodes in the first set 505 are arranged transverse from electrodes in the second set 506. The electrodes in the first set 505 or second set 506 may be sense electrodes, transmit electrodes, another type of electrodes, or combinations thereof.

The electrodes in the first set 505 or second set 506 may be made of a conductive material such as copper, gold, or another type of material. The electrodes in the first set 505 or second set 506 may be printed, etched, or otherwise formed on the substrate of the first electrode layer 501 or the second electrode layer 502 respectively.

While the capacitance module in this example uses a mutual capacitance sensor, in other examples, a different type of capacitance sensor, such as a self-capacitance sensor, may be used. In such examples, a stack of layers may include only one electrode layer.

In the illustrated example, the shield layer 503 is adjacent to the second electrode layer 502. The shield layer 503 may be constructed to minimize electrical noise that may interfere with electrical elements in the stack of layers, such as the electrodes of the first set 505 and second set 506 that form the mutual capacitance sensor. The shield layer 503 may be made out of a shielding material such as aluminum, steel, another appropriate shielding material, or combinations thereof.

In this example, a user may interact with the capacitance module by touching the capacitance reference surface, causing a change in the electric field generated by the electrodes of the first set 505 and second set 506. The mutual capacitance sensor formed by the electrodes of the first set 505 and second set 506 may sense the change in the electric field as a capacitance and interpret the change as input.

The capacitance module depicted in this example may be integrated into a personal computer device, such as a laptop. The sensitivity of the mutual capacitance sensor formed by the first electrode layer 501 and second electrode layer 502 of the stack of layers may be tuned so that only large changes in capacitance are interpreted as input. The mutual capacitance sensor may only detect input when a user physically touches the capacitance reference surface 500. In other examples, the sensitivity of a mutual capacitance sensor may be tuned to interpret smaller changes in capacitance as input. In these examples, a capacitance module may be used as a proximity sensor, where a user may interact with a device by bringing a finger, stylus, or the like near a capacitance reference surface. Devices that incorporate capacitance proximity sensors may include kiosks, buttons, mobile devices, tools, displays, other devices, and combinations thereof.

Components of a capacitance module, including layers such as electrode layers, shield layers, or capacitance reference surfaces, may be manufactured individually and sealed together at a different stage in the manufacturing process. In some cases, electrode layers may be sealed together first, forming a capacitance sensor. Then, a shield layer may be sealed on one side of the capacitance sensor. Alternative, each of the layers of the capacitance sensor and the shield may be sealed together at the same time.

A capacitance reference surface may be sealed to a capacitance sensor after one or more of the other layers are joined to the capacitance sensor. In some processes, to join a capacitance reference surface to a capacitance sensor, an adhesive may be applied between the capacitance reference surface and the capacitance sensor. The adhesive may have a thickness of as little as 100 microns after bonding the capacitance reference surface to the capacitance sensor. With the adhesive in place between the capacitance reference surface and the capacitance sensor, the capacitance reference surface and capacitance sensor may be joined together by applying a force to the capacitance reference surface and capacitance sensor. In cases where the capacitance reference surface is made of a flexible material, such as some plastic materials, force may be applied at first to the center of the reference surface and slowly applied toward the edges. As force is applied beginning at the center and gradually towards the edges where the capacitance reference surface meets the stack, the adhesive may spread out evenly between the two elements. Air may be pushed out between the capacitance reference surface and capacitance sensor, minimizing air bubbles that may be trapped between the capacitance reference surface and capacitance sensor once they have been sealed together.

In some examples, the amount of air bubbles between a capacitance reference surface and a capacitance sensor is desirable to be minimized. The presence of air bubbles may cause inconsistencies in the capacitance measurements of user input, which may result in a capacitance module being less accurate. Air bubbles may also reduce the durability of a capacitance module. With repeated use, an air bubble between a reference surface and sensor may expand. When the expansion of an air bubble becomes large enough, it may weaken the bond between the capacitance reference surface and the rest of the capacitance module.

In cases where a capacitance reference surface is made of a more rigid and/or brittle material, such as glass, applying force to only one portion of the surface at a time may damage the capacitance reference surface. Furthermore, using an adhesive of 100 microns may contribute to the overall thickness of a capacitance module. Thinner adhesives may be used, such as adhesives with a thickness of 25 to 60 microns, but such adhesives may have a lower laminar flow (i.e., ability to flow smoothly)/Thus attempting to spread out the adhesive may result in an uneven distribution of adhesive and a greater probability of air bubbles forming between a capacitance reference surface and substrate.

In some cases, to seal together a capacitance reference surface made of a more rigid material, such as glass, to a capacitance sensor using an adhesive with a thickness of 25 to 60 microns, a vacuum adhesion process may be used. In this process, suction openings may be defined through the capacitance sensor and other layers in the stack of layers. The adhesive may be applied to one side of a capacitance sensor. The adhesive may be spread throughout the surface of the capacitance sensor. For example, the adhesive, prior to bonding, may be in the form a solid sheet that covers the area of either the underside of the capacitance reference surface or the area of the capacitance sensor. Sith the adhesive in place, the stack of layers may be joined with a capacitance reference surface by applying uniform pressure to the substrate and capacitance reference surface while at the same time applying a vacuum suction through the suction openings defined in the capacitance sensor. By applying the suction, air may be suctioned out of the space between the reference capacitance surface and the capacitance sensor through the suction opening. Suctioning out air through a suction opening may result in a thinner and tighter seal between a capacitance reference surface and capacitance sensor. Further, the suction may remove all or reduce the amount of air bubbles between the reference capacitance surface and the capacitance sensor after the bond is formed. In some cases, a small amount of adhesive may also be pulled at least partially through the suction openings.

In FIG. 5a, suction openings 504 are defined in the first electrode layer 501, second electrode layer 502, and shield layer 503. The suction openings 504 are positioned on each layer such that they are offset from electrodes in the first set 505 and second set 506. In this example, each suction opening 504 goes through the first electrode layer 501, second electrode layer 502, and shield layer 503.

The adhesive 507 depicted between the capacitance reference surface 500 and first electrode layer 501 may have a thickness of 25 microns. In other examples, an adhesive may have a different thickness between 25 and 99 microns. The adhesive 507 may be in solid phase under standard temperature and pressure (STP) conditions, and liquid phase under conditions of higher temperature and/or pressure.

During a vacuum adhesion process, the adhesive 507 may be in liquid phase so that it may be suctioned through the suction openings 504.

In even other examples, an adhesive may be solid under both STP conditions and conditions of higher temperature and/or pressure. In these examples, the adhesive may not be suctioned through the suction openings during a vacuum adhesion process, however, air suctioned through the suction openings may still form a tighter and more durable seal between a capacitance reference surface and capacitance sensor.

Figure 5B:
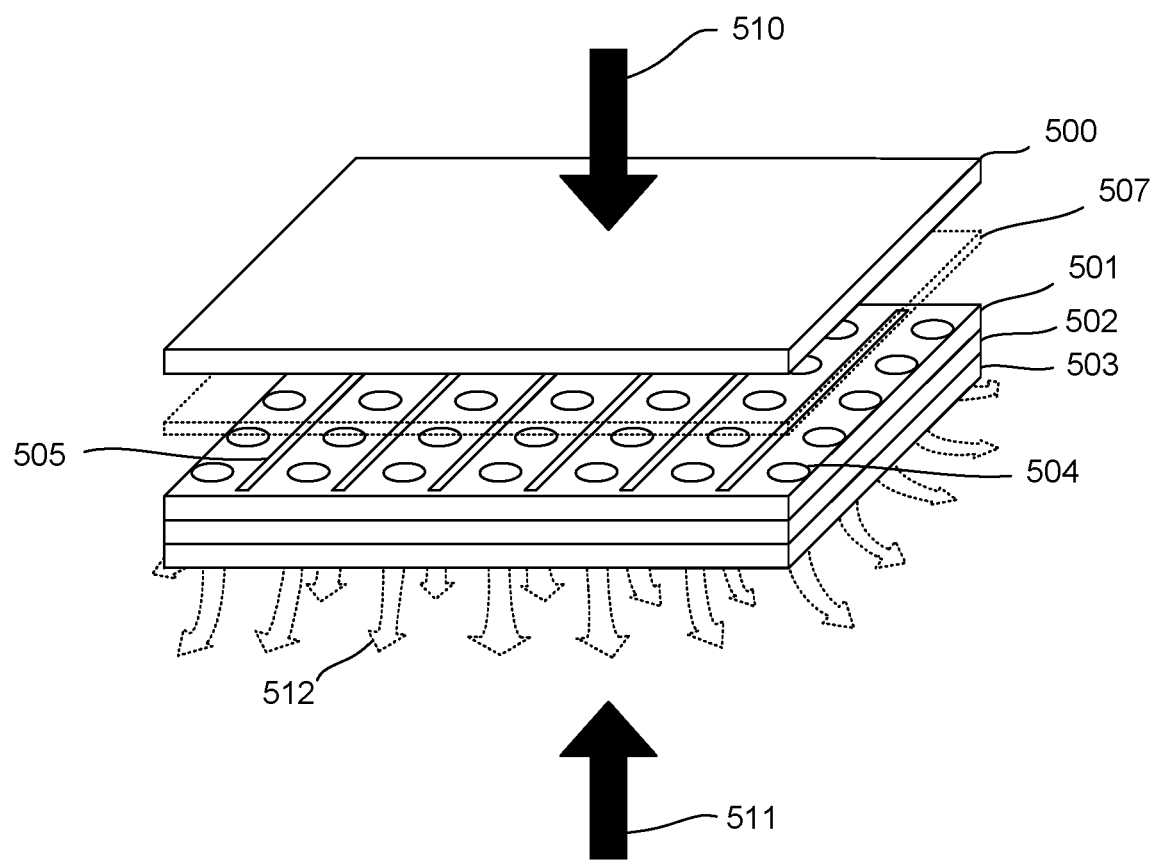
FIG. 5b depicts an exploded view of a stack of layers in accordance with the present disclosure.

FIG. 5b depicts the stack of layers depicted in FIG. 5a during a vacuum adhesion process. A downward force 510 may be applied to the capacitance reference surface 500. An upward force 511 may be applied to the shield layer 503. The forces 510, 511 may be applied such that the capacitance reference surface 500 is sealed to the first electrode layer 501, second electrode layer 502, and shield layer 503.

For illustrative purposes, a suction force 512 is depicted with dashed arrows. The adhesive 507 and air may be pulled through the suction openings 504 by the suction force 512. The suction force 512 may be achieved by applying the forces 510, 511 to the stack of layers in a vacuum chamber. In other examples, suction force may be achieved by attaching a nozzle to one side of the stack of layers and vacuuming through the nozzle. Suctioning air and adhesive through the suction openings 504 may result a tighter and more durable seal between the layers 500-503.

The suction force 512 may be uniform across all the suction openings 504, or the suction force may be varied across the suction openings. Because of variance in the air density between the layers 500-503, varying the suction force 512 to account for variance may result in a tighter and more uniform seal between the layers 500-503. For example, there may be more air between layers in some portions of the stack than in others. By applying a greater suction force to suction openings in those portions, the seal between the layers may be more uniform.

Figure 5C:
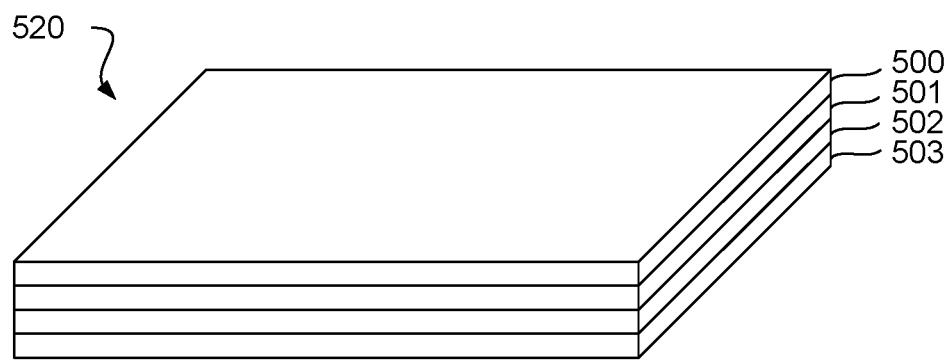
FIG. 5c depicts an example of a capacitance module in accordance with the present disclosure.

FIG. 5c depicts an example of a capacitance module 520 in accordance with the present disclosure. The capacitance module 520 includes the capacitance reference surface 500, first electrode layer 501, second electrode layer 502, and shield layer 503 described in FIGS. 5a-5b after the layers have been joined together in the vacuum adhesion process.

Figure 6:
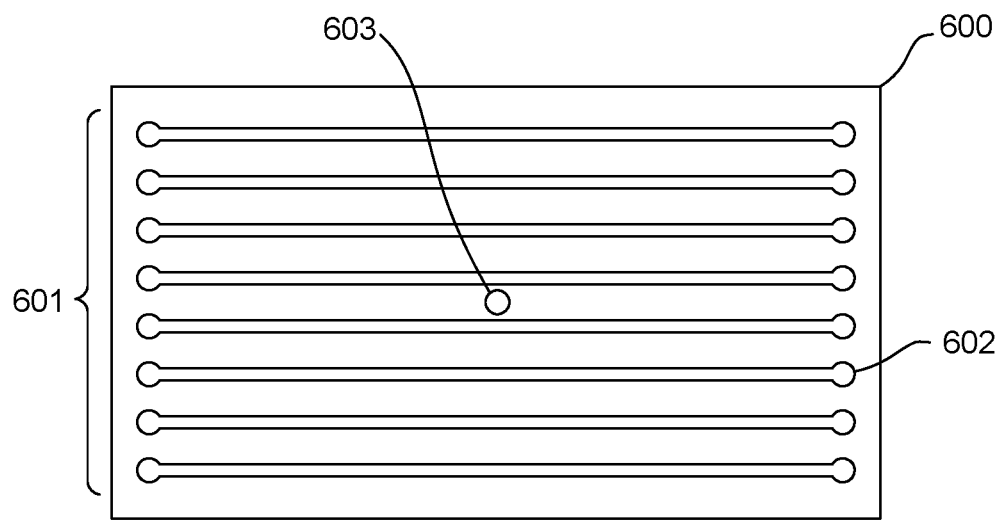
FIG. 6 depicts an example of a substrate with a set of electrodes and suction opening in accordance with the present disclosure.

FIG. 6 depicts an example of a substrate 600. The substrate contains a set 601 of electrodes 602. A suction opening 603 is defined in the center of the substrate. The substrate 601 may be made of copper, plastic, fiberglass, epoxy, another appropriate substrate material, or a combination thereof.

The electrodes 602 in the set 601 may be made of copper, gold, another conductive material, or a combination thereof. The electrodes 602 may be etched, printed, or otherwise deposited on the substrate 600. The electrodes 602 may be transmit electrodes, sense electrodes, another type of electrodes, or combinations thereof. In this example, the set 601 of electrodes 602 forms a self-capacitance sensor. While this example depicts a substrate of a capacitance module with a self-capacitance sensor, in other examples, a capacitance module may incorporate a mutual capacitance sensor formed by at least two sets of electrodes.

The substrate 600 includes a suction opening 603. The suction opening 603 is defined near the center of the substrate 600 and is between two electrodes of the set 601 of electrodes 602. While a substrate may incorporate rows of suction openings, the substrate 600 the substrate 600 includes only one suction opening.

The suction opening 603 is defined offset from any electrodes 602 in the set 601 of electrodes. In examples where a substrate includes two or more sets of electrodes, such as a mutual capacitance sensor, a suction opening may be defined in the anti-node of the sensor.

Figure 7:
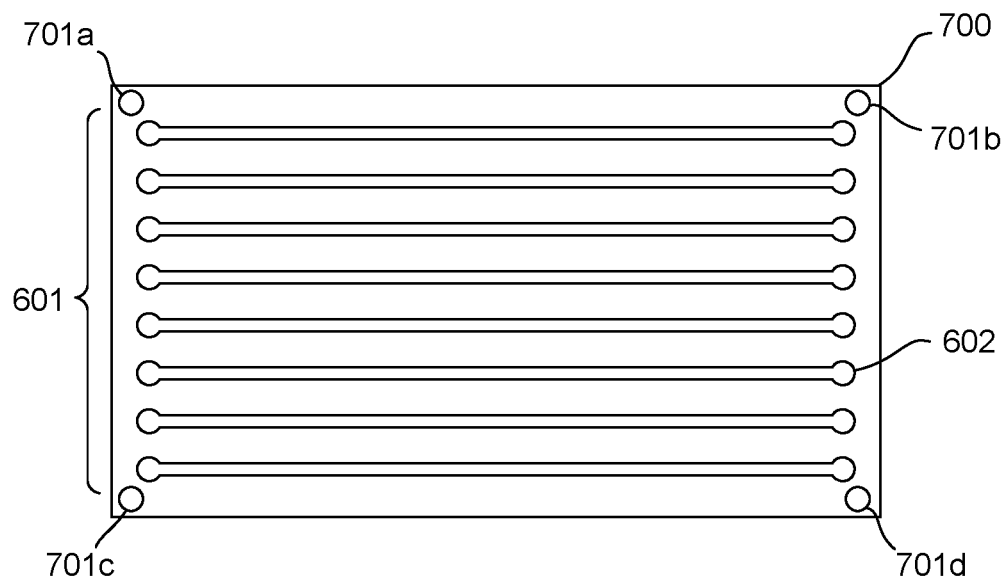
FIG. 7 depicts an example of a substrate with a set of electrodes and suction openings in accordance with the present disclosure.

FIG. 7 depicts an example of a substrate 700 with a set 601 of electrodes 602 and suction openings 701a, 701b, 701c, and 701d. In this example, a first suction opening 701a is defined in one corner of the substrate 700, a second suction opening 701b is defined in another corner of the substrate, a third suction opening 701c is defined in another corner of the substrate, and a fourth suction opening 701d is defined in another corner of the substrate. Including multiple suction openings in a substrate may contribute to a tighter seal and more evenly distributed adhesive once the substrate has been adhered to a capacitance reference surface.

Figure 8:
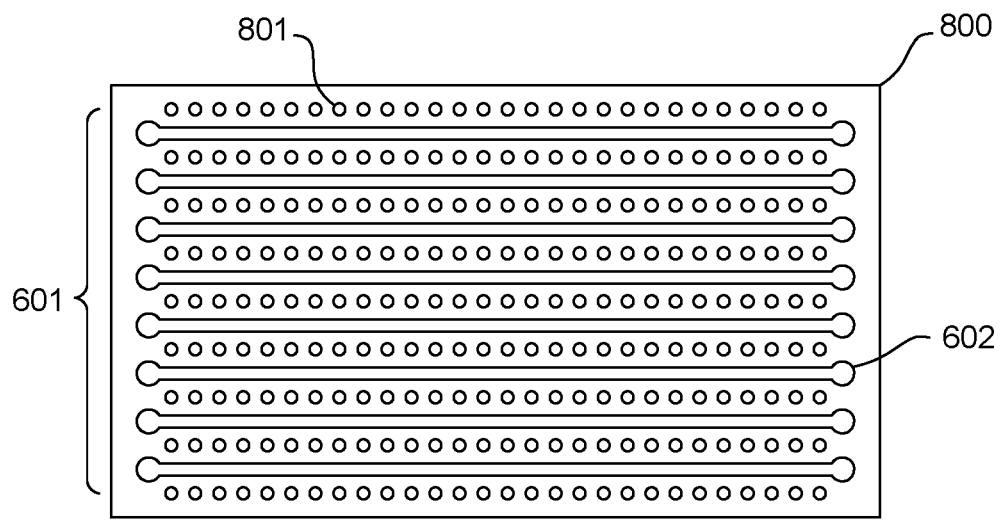
FIG. 8 depicts an example of a substrate with a set of electrodes and suction openings in accordance with the present disclosure.

FIG. 8 depicts an example of a substrate 800 with a set 601 of electrodes and suction openings. In this example, rows of suction openings 801 are defined between each electrode 602 in the set 601 of electrodes. While the rows of suction openings in this example contain 28 openings, a row may have a different number of suction openings. A row of suction openings may also incorporate openings of larger size, smaller size, or combinations thereof. Including rows of suction openings in a substrate may contribute to a tighter seal between a capacitance reference surface and a substrate after they have been adhered using a process of vacuum adhesion.

Figure 9:
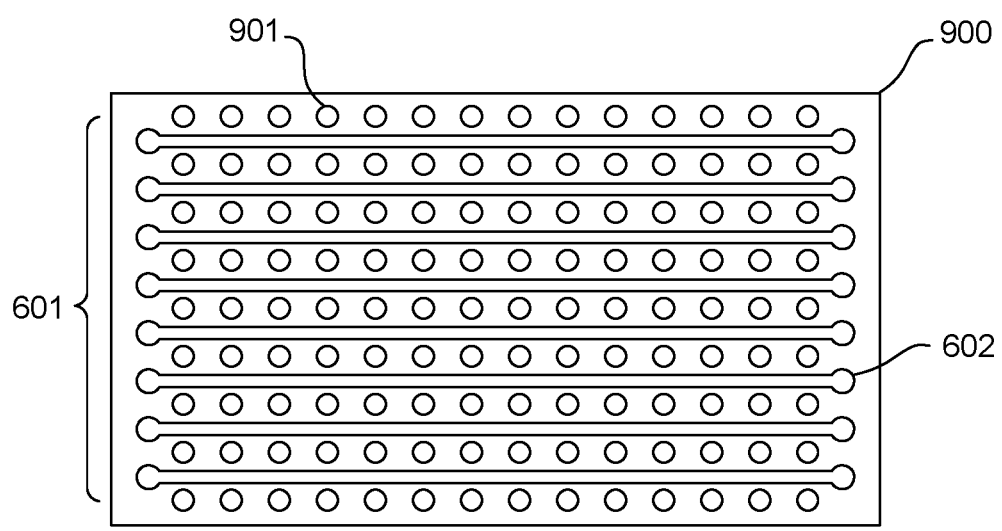
FIG. 9 depicts an example of a substrate with a set of electrodes and suction openings in accordance with the present disclosure.

FIG. 9 depicts an example of a substrate 900 with a set 601 of electrodes and suction openings 901. In this example, rows of suction openings 901 are defined between the electrodes 602 in the set 601 of electrodes. The suction openings 901 depicted in FIG. 9 have a greater surface area than the suction openings 801 depicted in FIG. 8. The size of a suction opening presents a trade-off. Rows of larger suction openings may include fewer suction openings, which may be easier to manufacture, whereas rows of smaller suction openings may include more suction openings, which may disperse a suction effect more effectively during a process of vacuum adhesion.

Figure 10:
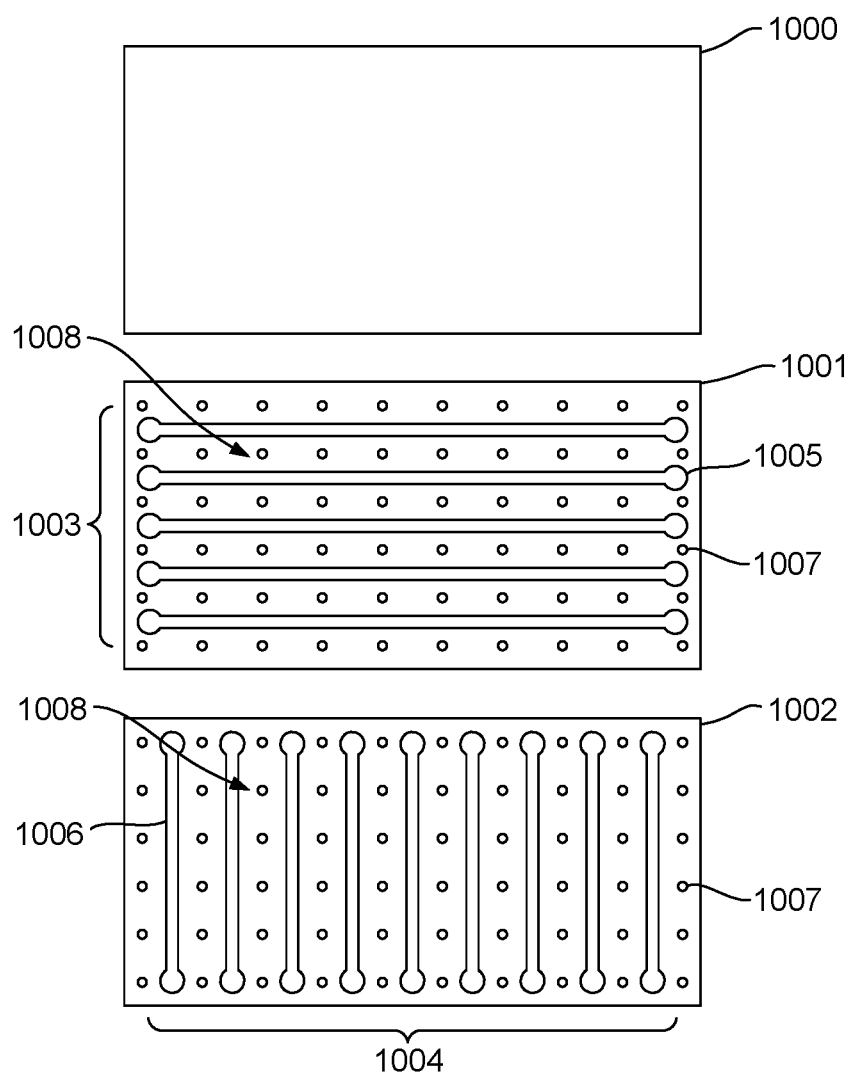
FIG. 10 depicts an example of a stack of layers in accordance with the present disclosure.

FIG. 10 depicts an example of a stack of layers in accordance with the present disclosure. In this example, the stack includes a capacitance reference surface 1000, a first electrode layer 1001, and a second electrode layer 1002. While three layers are identified in this example, a stack of layers may include more or less layers. For example, a stack may include two layers, three layers, four layers, a different number of layers, or combinations thereof.

The capacitance reference surface 1000 may be made out of a rigid material, such as glass. The shear modulus of the rigid material may be 26.2 GPa. In other examples, the shear modulus of the rigid material may have a different value. For example, the shear modulus of a rigid material may have a value within the range of 6 to 35 GPa.

The first electrode layer 1001 includes a first set 1003 of electrodes 1005. The first electrode layer 1001 may be a substrate or printed circuit board (PCB). The electrodes 1005 in the first set 1003 may be sense electrodes, transmit electrodes, another type of electrodes, or a combination thereof. The electrodes 1005 may be etched, printed, or otherwise formed on the substrate of the first electrode layer 1001.

The second electrode layer 1002 includes a second set 1004 of electrodes 1006. The second electrode layer may be a substrate or PCB. The electrodes 1006 in the second set 1004 may be sense electrodes, transmit electrodes, another type of electrodes, or combinations thereof. The electrodes 1006 may be etched, printed, or otherwise formed on the substrate of the second electrode layer 1004.

In this example, the electrodes 1005 of the first set 1003 are arranged transverse from the electrodes 1006 of the first set 1004. Together, the first set 1003 and second set 1004 form a mutual capacitance sensor. While the first and second set 1003,1004 are arranged transverse from each other in this example, in other examples, the relative arrangement of electrodes may be different. For example, electrodes may be arranged in non-rectangular patterns, such as radial patterns, linear strings, etc.

Rows of suction openings 1007 are defined through the substrates of the first and second electrode layers 1001, 1002 between the electrodes 1005, 1006 of the first set 1003 and second set 1004 of electrodes. A suction opening 1007 in one layer may line up with a suction opening on an adjacent layer. By having suction openings on adjacent layers overlapping each other, both layers may be adhered more effectively to a reference surface.

Each suction opening 1007 may be defined in an anti-node 1008 of the mutual capacitance sensor. By defining each suction opening 1007 in an anti-node of the mutual capacitance sensor, the electrodes 1005, 1006 may operate free from interference from the suction openings.

In some instances, a first layer and a second layer may be manufactured in a first part of a manufacturing process. At a second stage in the manufacturing process, a first and second layer may be joined together. Suction openings may be formed in the substrates of each layer after the first part of the manufacturing process, or they may be formed after the second part of the manufacturing process. For example, during the manufacturing of a mutual capacitance sensor that includes a first electrode layer and a second electrode layer, suction openings may be formed before the first electrode layer and second electrode layer have been joined together, or they may be formed after they have been joined together. Forming suction openings in adjacent layers after they have been joined together may streamline the manufacturing process and ensure consistency of overlapping openings.

After the first electrode layer 1001 and second electrode layer 1002 have been joined together, the first electrode and second electrode layer may be adhered to the capacitance reference surface 1000 using a vacuum adhesion process. In this process, an adhesive between 25 and 50 microns may be applied to the side of the first electrode layer 1001 that is adjacent to the capacitance reference surface 1000. Then, a force may be applied to both the capacitance reference surface 1000 and the first and second electrode layers 1001,1002. As the force is applied, adhesive and/or air may be suctioned out through the suction openings 1007 using a suction force. The suction force may be administered by a vacuum attached to one side of the second electrode layer 1002, or the layers may be joined together in a vacuum chamber.

By adhering the first electrode layer 1001 and second electrode layer 1002 to the capacitance reference surface 1000 using a vacuum adhesion process, air bubbles formed between the capacitance reference surface and electrode layers may be minimized, leading to a tighter seal. A capacitance module with a tighter seal between its reference surface and capacitance sensor may be more durable and accurate.

The size of suction openings in a substrate may have an effect on a vacuum adhesion process. The larger a suction opening is, the less force may be needed to suction air and/or adhesive through the opening. Larger suction openings may also have a lower distribution density (be spaced further apart from each other) in a substrate. The size, shape, and distribution density of suction openings throughout a substrate may be varied to optimize the effectiveness of a vacuum adhesion process. A substrate may incorporate suction openings of a smaller size and distribution density in one part of a substrate and incorporate suction openings of a larger size and distribution density in another part of the substrate.

Figure 11:
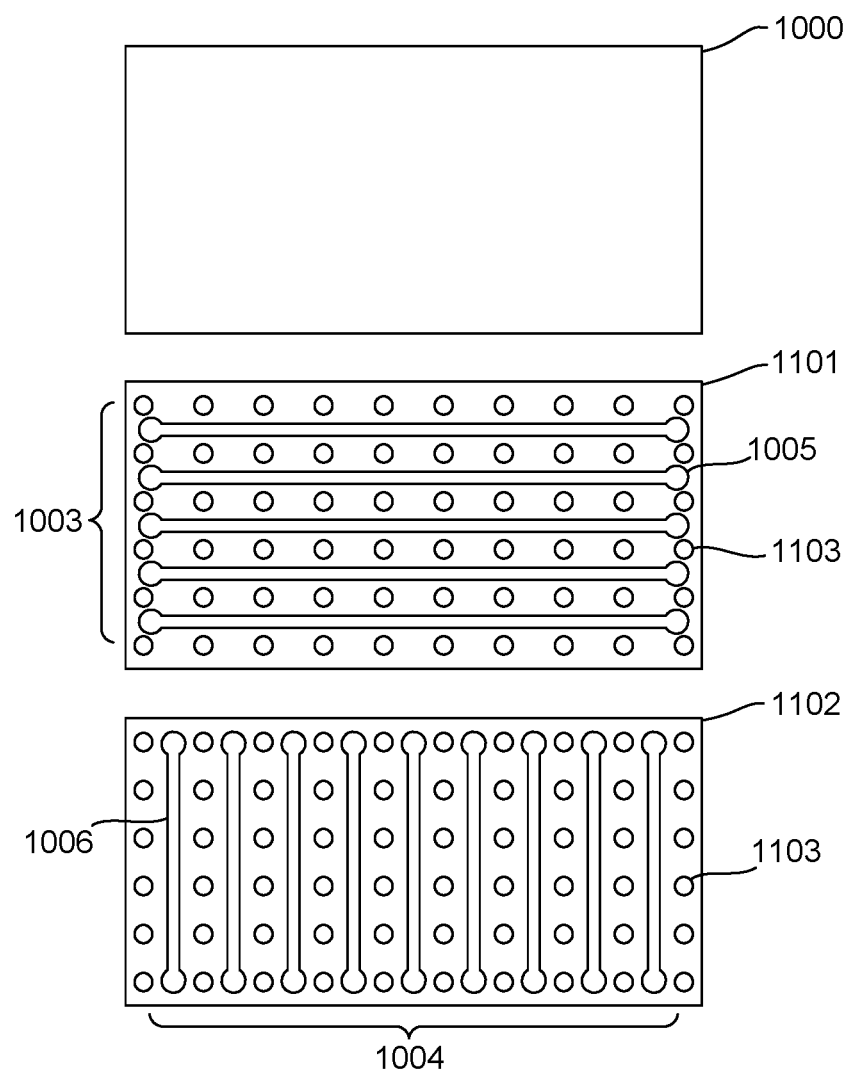
FIG. 11 depicts an example of a stack of layers in accordance with the present disclosure.

FIG. 11 depicts an example of a stack of layers in accordance with the disclosure. In this example, a first electrode layer 1101 and second electrode layer 1102 include rows of suction openings 1103 between the electrodes 1005,1006 in the first set 1003 and second set 1004 of electrodes. The suction openings 1103 are larger than the suction openings 1007 shown in FIG. 10.

While a capacitance module made of a stack of layers may include a capacitance reference surface layer and at least one electrode layer, capacitance modules may incorporate more layers. For example, a stack of layers may include a shield layer, component layer, antenna layer, haptic layer, another type of layer, or combinations thereof. When layers incorporate suction openings, each suction opening may be defined through multiple adjacent layers, excluding the capacitance reference surface layer. Defining suction openings through multiple layers may enable a vacuum adhesion process between a stack of layers and a reference surface. In some examples, the capacitance reference surface is not part of the capacitance module.

Figure 12:
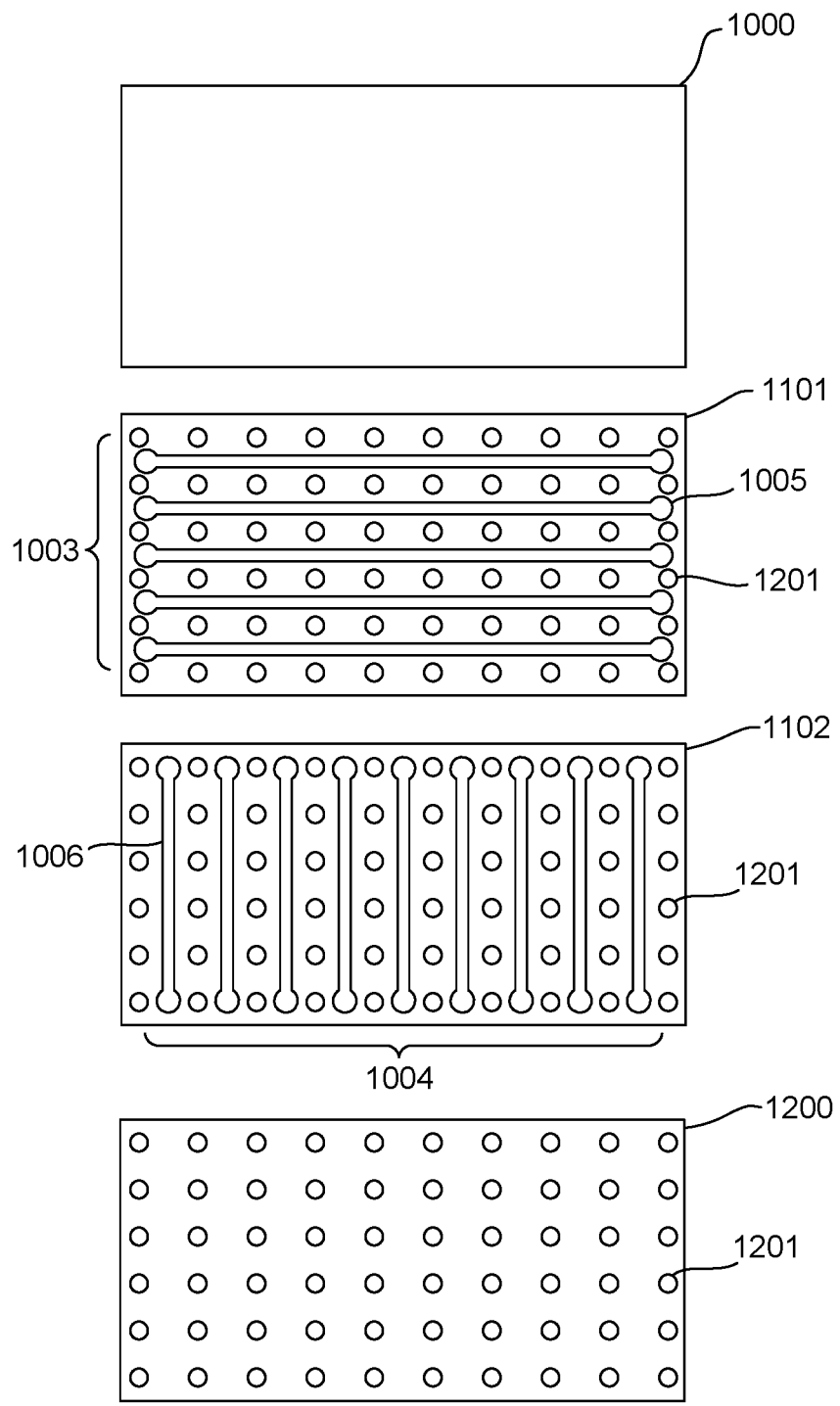
FIG. 12 depicts an example of a stack of layers in accordance with the present disclosure.

FIG. 12 depicts an example of a stack of layers. In this example, the stack includes the capacitance reference surface 1000, the first electrode layer 1101, the second electrode layer 1102, and a shield layer 1200.

In this example, the shield layer 1200 is adjacent to the second electrode layer 1102. The shield layer is constructed to minimize electrical noise that may interfere with the mutual capacitance sensor. The shield layer 1200 may include copper, aluminum, and/or other appropriate shielding material. The shield material may be etched, printed, or otherwise deposited on a substrate of the shield layer.

Rows of suction openings 1201 are defined in the first electrode layer 1101, second electrode layer 1102, and shield layer 1200. Each of the suction openings 1201 are defined through the first electrode layer 1101, second electrode layer 1102, and shield layer 1200. The suction openings 1201 are positioned between the electrodes 1005, 1006 of the first set 1003 and second set 1006 such that the electrodes and suction openings occupy different portions of the first electrode layer 1101 and second electrode layer 1102.

Figure 13:
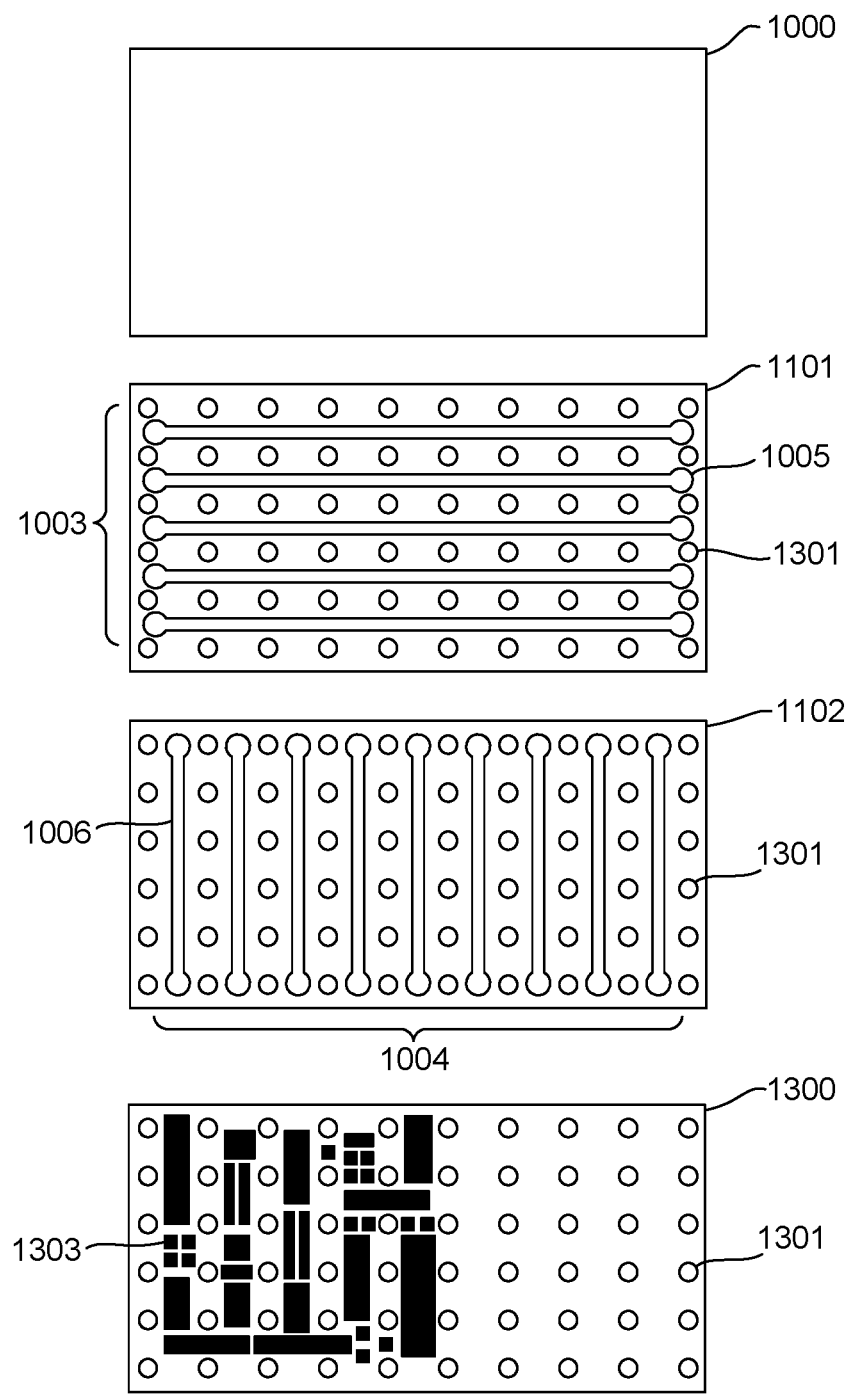
FIG. 13 depicts an example of a stack of layers in accordance with the present disclosure.

FIG. 13 depicts an example of a stack of layers. In this example, the stack includes the capacitance reference surface 1000, the first electrode layer 1101, the second electrode layer 1102, and a component layer 1300.

In this example, the component layer 1300 is adjacent to the second electrode layer 1102. The component layer 1300 may include a printed circuit board. The component layer 1300 may contain individual components 1303 that are used to operate the capacitance module. Components may include but are not limited to a central processing unit (CPU), a digital signal processor (DSP), an analog front end (AFE), an amplifier, a peripheral interface controller (PIC), another type of microprocessor, an integrated circuit, a field programmable gate array (FPGA), an application specific integrated circuit (ASIC), a combination of logic gate circuitry, other types of digital or analog electrical components, or combinations thereof.

Rows of suction openings 1301 are defined in the first electrode layer 1101, second electrode layer 1102, and component layer 1300. Each suction opening 1301 is defined through each of the three layers. The rows of suction openings 1301 are defined offset from the electrodes 1005, 1006 in the first set 1003 and second set 1004 of electrodes. The position of the components 1303 on the component layer 1300 may be based on the position of the suction openings 1301 so that the components and suction openings are offset from each other.

Figure 14:
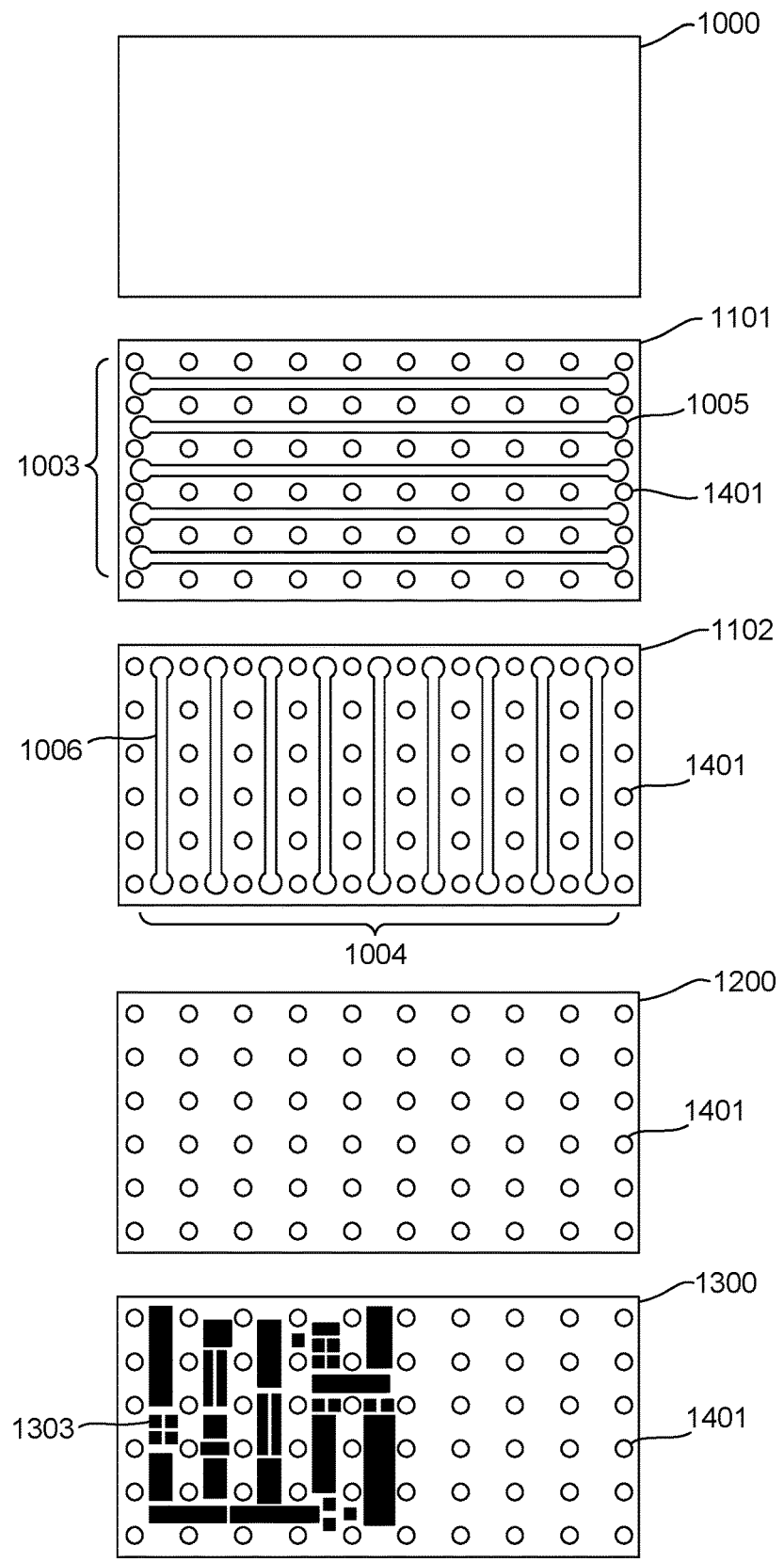
FIG. 14 depicts an example of a stack of layers in accordance with the present disclosure.

FIG. 14 depicts an example of a stack of layers in accordance with the disclosure. In this example, the stack of layers includes the capacitance reference surface 1000, first electrode layer 1101, second electrode layer 1102, shield layer 1200, and component layer 1300. Rows of suction openings 1401 are defined on the first electrode layer 1101, second electrode layer 1102, shield layer 1200, and component layer 1300.

Figure 15A:
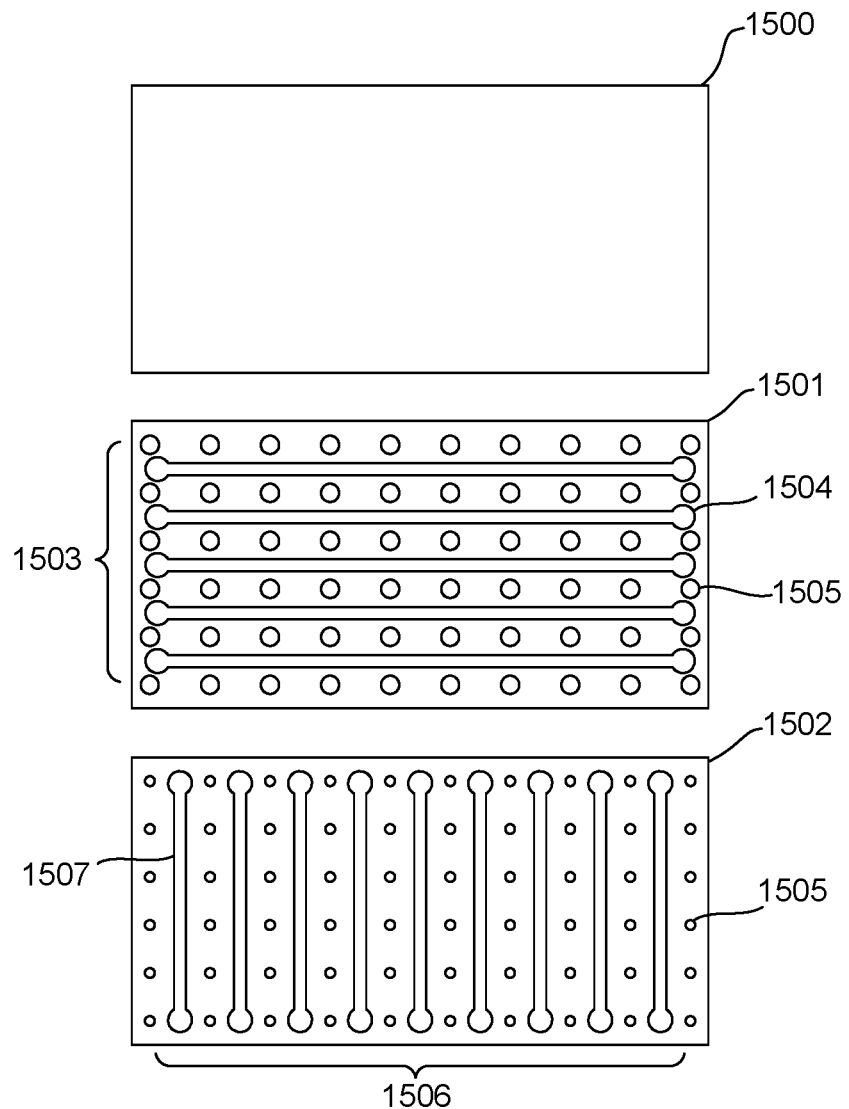
FIG. 15a depicts an example of a stack of layers in accordance with the present disclosure.

FIG. 15a depicts an example of a stack of layers in accordance with the disclosure. In this example, the stack includes a capacitance reference surface 1500, a first electrode layer 1501 with a first set 1503 of electrodes 1504, and a second electrode layer 1502 with a second set 1506 of electrodes 1507.

In the examples depicted in FIGS. 10-14, each suction opening defined through adjacent layers in the stack had a taper of zero degrees, however, suction openings defined through layers may have a different taper. The taper of a suction opening may affect the effectiveness of a vacuum adhesion process. In this example, rows of suction openings 1505 defined in the first electrode layer 1501 and second electrode layer 1502 taper inward at approximately five degrees. Because of the taper, the suction openings 1505 in this example have a smaller opening on one side of the second electrode layer 1502 than the opening on one side of the first electrode layer 1501.

During a vacuum adhesion process, air and/or adhesive may be suctioned out through the suction openings 1505. The adhesive may be between the first electrode layer 1501 and capacitance reference surface 1500, being suctioned through the suction openings 1505 towards one side of the second electrode layer 1502. The taper of each suction opening 1505 may restrict air flow, creating a higher-pressure suction towards one end of each suction opening 1505. The higher pressure caused by the tapered suction openings 1505 may result in a tighter seal between the capacitance reference surface 1500 and mutual capacitance sensor formed by the first electrode layer 1501 and second electrode layer 1502 than a seal where suction openings had a zero-degree taper.

Figure 15B:
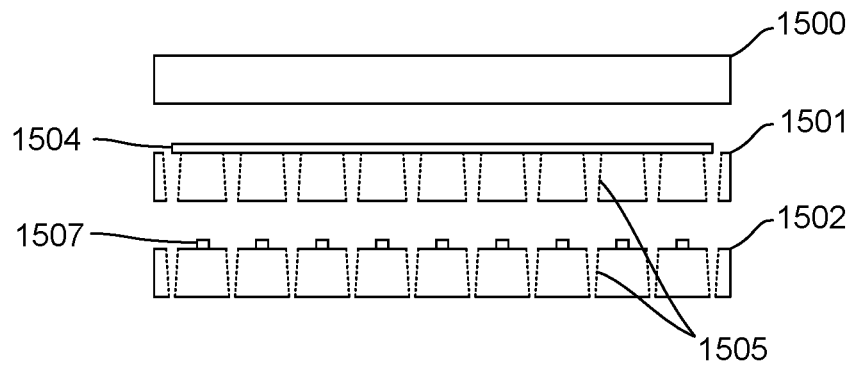
FIG. 15b depicts an example of a stack of layers in accordance with the present disclosure.

FIG. 15b depicts a cross sectional view of the stack of layers depicted in FIG. 15a. For illustrative purposes, the suction openings 1505 are shown with dashed lines where they are defined through the substrates of the first electrode layer 1501 and second electrode layer 1502.

While this example depicts suction openings 1505 with an inward taper of approximately five degrees, in other examples, suction openings may be tapered differently. For example, a suction opening may have an inward taper of 10 degrees, 15 degrees, or 20 degrees, or a different number of degrees. In other examples, a suction opening may have an outward taper of 5 degrees, 10 degrees, or 20 degrees, or a different number of degrees.

Figure 16A:
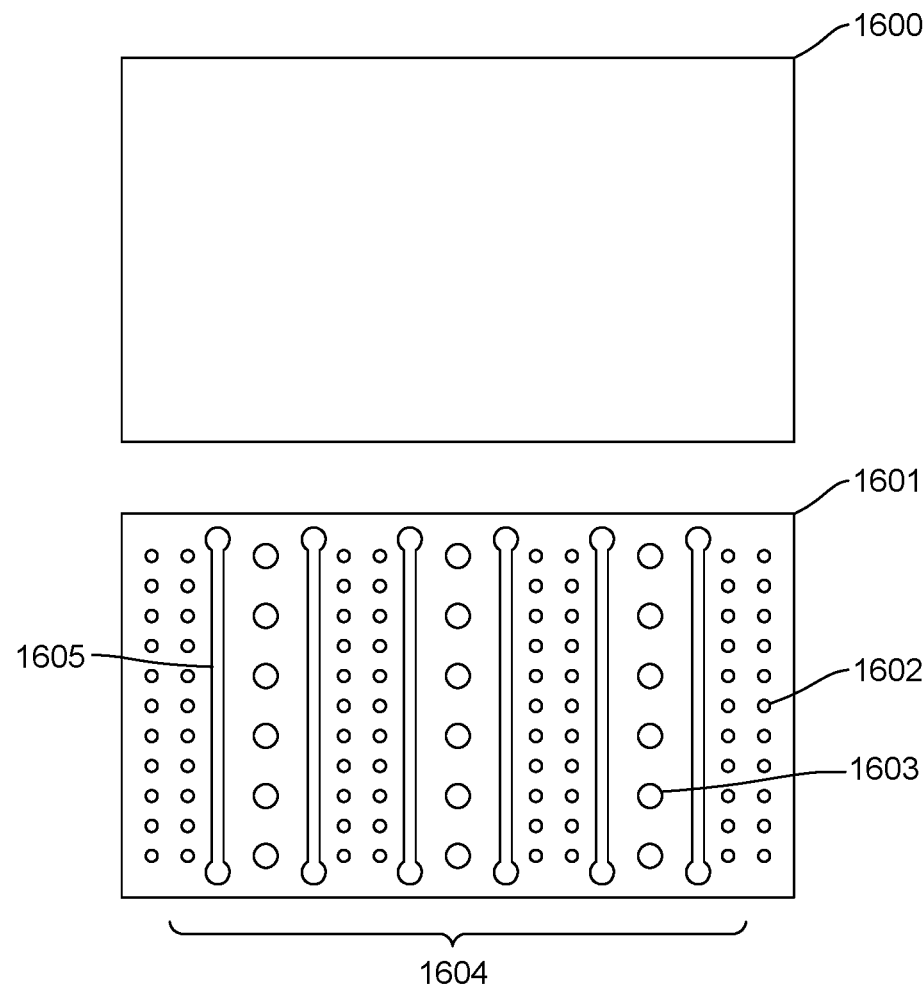
FIG. 16a depicts an example of a stack of layers in accordance with the present disclosure.

FIG. 16a depicts an example of a stack of layers in accordance with the present disclosure. In this example, the stack includes a capacitance reference surface 1600 and an electrode layer 1601 with a set 1604 of electrodes 1605. The electrodes 1605 in the set 1604 form a self-capacitance sensor.

In this example, the electrode layer 1601 includes suction openings of different sizes: a small suction opening 1602 and a large suction opening 1603. The electrode layer 1601 includes eight columns of small suction openings 1602 and three columns of large suction openings 1603 interspersed between the electrodes 1605 of the set 1604 of electrodes.

Including suction openings of different sizes on a substrate may affect the effectiveness of a vacuum adhesion process. The position of suction openings may be based, in part, on their size. Because larger suction openings have greater surface area but may not exert as much suctional pressure, they may be positioned in places of the substrate where a tighter seal is not as crucial a factor to the durability of a capacitance module, such as the center. Smaller suction openings with smaller surface areas may exert more pressure than larger suction openings, so they may be positioned near the outer edges of a substrate where the substrate is more likely to become unsealed from a capacitance reference surface. The position and size of suction openings in a substrate may also depend on other factors.

Figure 16B:
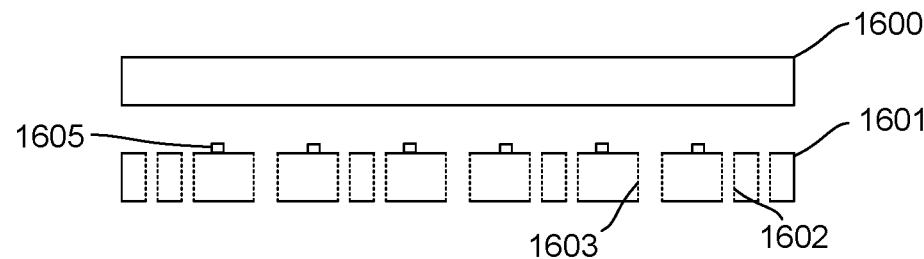
FIG. 16b depicts an example of a stack of layers in accordance with the present disclosure.

FIG. 16b depicts a cross sectional view of the stack of layers depicted in FIG. 16a. For illustrative purposes, the suction openings defined through the substrate of the electrode layer 1601 are represented as dashed lines. In this example, each large suction openings 1603 and small suction opening 1602 has a taper of zero degrees and a circular shaped opening. In other examples, suction openings may have different tapers. Furthermore, in other examples, the opening of a suction opening may have a differently shaped opening, such as a square shaped opening, triangular shaped opening, another shaped opening, or combinations thereof.

Figure 17:
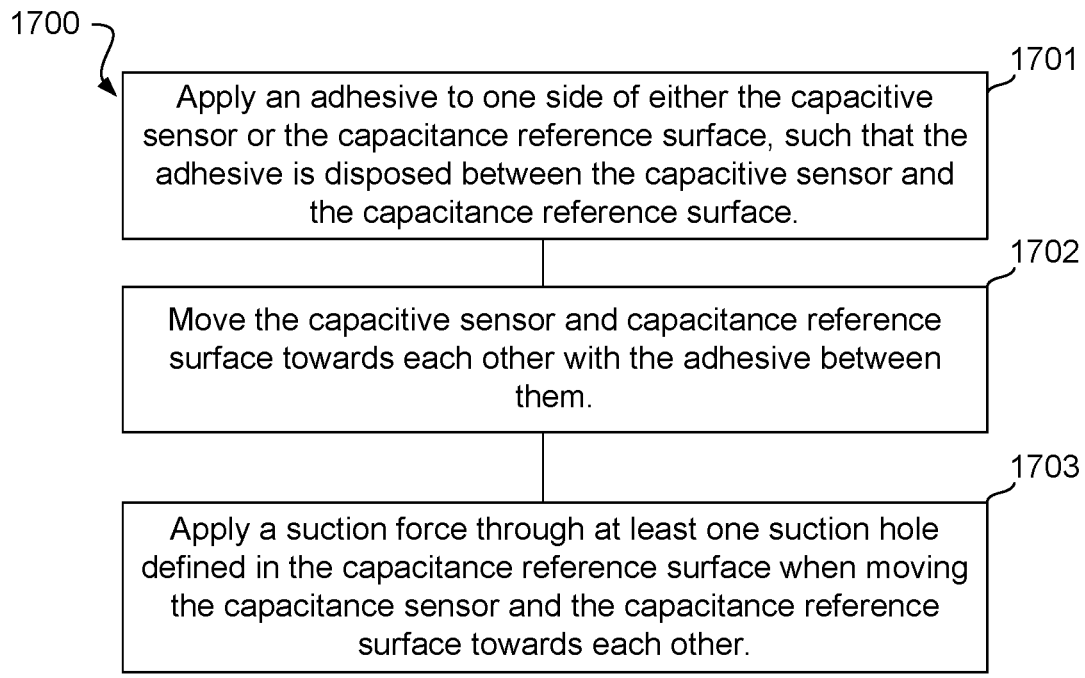
FIG. 17 depicts an example of a method for adhering a capacitance module to a capacitance reference surface in accordance with the present disclosure.

FIG. 17 depicts an example of a method 1700 for adhering a capacitance module to a capacitance reference surface in accordance with the present disclosure. The method 1700 may be performed based on the description of the devices, modules, and principles described in FIGS. 1-16c. In this example, the method includes applying 1701 adhesive to one side of either a capacitive sensor or a capacitance reference surface, such that the adhesive is disposed between the capacitive sensor and the capacitance reference surface, moving 1702 the capacitive sensor and capacitance reference surface towards each other with the adhesive between them, and applying 1703 a suction force through at least one suction opening defined in the capacitance reference surface when moving the capacitance sensor and the capacitance reference surface towards each other.

The location of the suction opening defined in the capacitive sensor may be based, in part, on the location of the electrodes in the capacitive sensor. During the process of joining the capacitive sensor and capacitance reference surface, air may be suctioned through the suction opening, which may reduce the amount of air bubbles between the capacitive sensor and capacitance reference surface.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module apparatus, comprising:
a substrate containing a set of capacitance-sensing electrodes on an electrode layer forming a capacitance sensor area on a first side of the substrate;
an adhesive applied to electrode layer and spread throughout the capacitance sensor area;
a suction opening defined through the substrate in the capacitance sensor area between the capacitance-sensing electrodes on the first side of the substrate;
wherein air and/or adhesive are suctioned through the suction opening during vacuum adhesion between the substrate and a reference capacitance surface.

2. The apparatus of claim 1, wherein the position of the suction opening is based, in part, on the position of the capacitance-sensing electrodes on the substrate.

3. The apparatus of claim 1, wherein the suction opening has a taper between −20 and 20 degrees.

4. The apparatus of claim 3, wherein the taper of the suction opening has the effect of changing the force of suction during vacuum adhesion.

5. The apparatus of claim 1, wherein rows of suction openings are defined in the substrate.

6. The apparatus of claim 1, wherein the substrate is adhered to a capacitance reference surface.

7. The apparatus of claim 1, wherein the adhesive has a thickness between five and one hundred microns.

8. The apparatus of claim 7, wherein the capacitance reference surface is a touchpad overlay.

9. The apparatus of claim 7, wherein the apparatus is part of a keyboard housing.

10. The apparatus of claim 7, wherein the capacitance reference surface is comprised of a rigid material.

11. The apparatus of claim 7, wherein the suction opening is defined through a shield layer in the stack of layers.

12. The apparatus of claim 7, wherein the suction opening is defined through a component layer in the stack of layers.

13. The apparatus of claim 7, wherein the suction opening is defined through every layer in the stack of layers.

14. The apparatus of claim 7, wherein multiple suction openings are defined through the sensor layer.

15. The apparatus of claim 7, wherein the suction opening is defined in an anti-node formed by multiple sets of electrodes.

16. The apparatus of claim 7, wherein an adhesive is at least partially deposited in the suction opening from being suctioned through the suction opening during a vacuum adhesion process between the stack of layers and the capacitance reference surface.

17. The apparatus of claim 7, wherein the capacitance reference surface has a shear modulus of 6.0 to 100.0 GPa.

18. An apparatus, comprising:
a stack of layers, the stack including:
a sensor layer containing a set of electrodes where the electrodes define a capacitance sensor area on a first side of the substrate;
a suction opening defined through the sensor layer and located between the electrodes on the first side of the substrate;
a capacitance reference surface adjacent to the sensor layer;
an adhesive between the sensor layer and the capacitance reference surface where the adhesive is applied directly to the capacitance sensor area;
wherein a portion of the adhesive has been suctioned through the suction opening during vacuum adhesion between the substrate and a reference capacitance surface.

19. A method for adhering a capacitive sensor to a capacitance reference surface, comprising:
applying an adhesive to one side of either the capacitive sensor or the capacitance reference surface, such that the adhesive is disposed between the capacitive sensor and the capacitance reference surface;
moving the capacitive sensor and capacitance reference surface towards each other with the adhesive between them; and
applying a suction force through at least one suction opening defined in the capacitance reference surface when moving the capacitance sensor and the capacitance reference surface towards each other;
wherein air is suctioned through the at least one suction opening in the capacitive sensor;
wherein the suctioning of air through the at least one suction opening has the function of reducing the amount of air bubbles between the capacitive sensor and the capacitive reference surface.

20. The method of claim 19, wherein the position of the at least one suction opening defined in the capacitive sensor is based, in part, on the location of electrodes in the capacitive sensor.

* * * * *